United States Patent [19]

Register et al.

[11] Patent Number: 5,371,807
[45] Date of Patent: Dec. 6, 1994

[54] METHOD AND APPARATUS FOR TEXT CLASSIFICATION

[75] Inventors: Michael S. Register; Narasimhan Kannan, both of Colorado Springs, Colo.

[73] Assignee: Digital Equipment Corporation, Maynard, Mass.

[21] Appl. No.: 855,378

[22] Filed: Mar. 20, 1992

[51] Int. Cl.$^5$ .......................... G06K 9/72; G06F 15/38
[52] U.S. Cl. ........................................ 382/14; 382/40; 364/419.07; 364/419.08
[58] Field of Search .................... 382/36–38, 382/40, 14, 15; 395/21–23; 364/419

[56] References Cited

U.S. PATENT DOCUMENTS

| | | | |
|---|---|---|---|
| 4,674,065 | 6/1987 | Lange et al. | 382/40 |
| 4,682,365 | 7/1987 | Orita et al. | 382/14 |
| 4,754,489 | 6/1988 | Bokser | 382/14 |
| 4,876,731 | 10/1989 | Loris et al. | 382/40 |
| 5,050,218 | 9/1991 | Ikeda et al. | 382/1 |
| 5,056,021 | 10/1991 | Ausborn | 364/419 |
| 5,083,268 | 1/1992 | Hemphill et al. | 364/419 |
| 5,128,865 | 7/1992 | Sadler | 364/419 |
| 5,146,406 | 9/1992 | Jensen | 364/419 |

Primary Examiner—Leo H. Boudreau
Assistant Examiner—Chris Kelley
Attorney, Agent, or Firm—Kenyon & Kenyon

[57] ABSTRACT

A text classification system and method that can be used by an application for classifying natural language text input into a computer system having a domain specific knowledge base that includes a knowledge base having a plurality of categories. The text classification system classifies input natural language input text by first parsing the natural language input text into a first list of recognized keywords. This list is then used to deduce further facts from the natural language input text which are then compiled into a second list. Next, a numeric similarity score for each one of the plurality of categories in the knowledge base is calculated which indicates how similar one of the plurality of categories is to the natural language input text. A dynamic threshold is then applied to determine which ones of the plurality of categories are most similar to the recognized keywords of the natural language input text. A third list is compiled of the ones of the plurality of categories determined to be most similar to the recognized keywords. An optional rule base can be utilized to further refine the determination of which ones of the plurality of categories are most similar to the recognized keywords of the natural language input text. Also, an optional learning capability can be added to improve the accuracy of the text classification system.

24 Claims, 6 Drawing Sheets

METHOD AND APPARATUS FOR TEXT CLASSIFICATION

FIELD OF THE INVENTION

The present invention is directed to text classification and, more particularly, to a computer based system for text classification that provides a resource that can be utilized by external applications for text classification.

BACKGROUND OF THE INVENTION

The growing volume of publicly available, machine-readable textual information makes it increasingly necessary for businesses to automate the handling of such information to stay competitive. By automating the handling of text, businesses can decrease costs and increase quality in performing tasks that require access to textual information.

A commercially important class of text processing applications is text classification systems. Automated text classification systems identify the subject matter of a piece of text as belonging to one or more categories from a potentially large predefined set of categories. Text classification includes a class of applications that can solve a variety of problems in the indexing and routing of text.

Routing of text is useful in large organizations where there is a large volume of individual pieces of text that needs to be sent to specific persons (e.g., technical support specialists inside a large customer support center). Indexing text is useful in attaching topic labels to information and partitioning the information space to aid information retrieval. Indexing can facilitate the retrieval of information based upon the contents of text rather than boolean keyword searches from databases that include information such as news articles, federal regulations, etc.

A number of different approaches have been developed for automatic text processing. One approach is based upon information retrieval techniques utilizing boolean keyword searches. This approach, however, has problems with accuracy. A second approach borrows natural language processing from artificial intelligence technology to achieve higher accuracy. While natural language processing improves accuracy based upon an analysis of the meaning of input text, speed of execution and range of coverage becomes problematic when such techniques are applied to large volumes of text.

Others have recognized the foregoing shortcomings and have attempted to reach a middle ground between information retrieval techniques and natural language/knowledge-based techniques to achieve acceptable accuracy without sacrificing speed of execution or range of coverage. This has been accomplished through predominantly rule based systems which parse the input text using natural language morphology techniques, attempt to recognize concepts in the text, and then use a rule base to map from identified concepts to categories.

Text classification systems which rely upon rule-base techniques also suffer from a number of drawbacks. The most significant drawback being that such systems require a significant amount of knowledge engineering to develop a working system appropriate for a desired text classification application. It becomes more difficult to develop an application using rule-based systems because all the requisite knowledge is placed into a rule base. By doing this, a knowledge engineer must spend a significant amount of time tuning and experimenting with the rules to arrive at the correct set of rules to ensure that the rules work together properly for the desired application.

Another shortcoming in the foregoing systems is that there is no built in mechanism to allow the knowledge base portion of a text classification system to learn from the input text over time to thereby increase system accuracy. The addition of a learning component to enhance the accuracy of a text classification system would be desirable to improve the performance of the system over time.

SUMMARY OF THE INVENTION

The present invention provides a method and system for performing text classification. Specifically, the system provides a core structure that performs text classification for external applications. It provides a core run time engine for executing text classification applications around which the knowledge needed to perform text classification can be built.

Generally, the operating environment of the present invention includes a general purpose computer system which comprises a central processing unit having memory, and associated peripheral equipment such as disk drives, tape drives and video display terminals. The system of the present invention resides in either memory or one of the storage devices. It is invoked by an application running on the central processing unit to classify input text. A knowledge base is maintained on the disk drive or some other storage medium in the computer system.

The method of classifying text according to the present invention begins upon acceptance of natural language input text which can be supplied by an external application. The input text is then parsed into a first list of recognized keywords which may include, e.g., words, phrases and regular expressions. The first list is used to deduce further facts from the natural language input text which are useful in classifying the input text. The deduced facts are then compiled into a second list. Then, utilizing the first list, the present invention calculates a numeric similarity score for each one of a plurality of categories in the knowledge base which indicates how similar one of the plurality of categories is to the recognized keywords in the first list. A dynamic threshold is then applied to determine which ones of the categories are most similar to the recognized keywords of the natural language input text. The result is a third list which includes the categories that the recognized keywords are most similar. At this point, the text classification operation of the present invention is complete and the first, second and third lists can be passed on to the external application for application specific processing.

The architecture of the text classification system of the present invention comprises a natural language module, an intelligent inferencer module and a similarity measuring module. The natural language module extracts as much information as possible directly from natural language input text received by the text classification system from an external application. The intelligent inferencer module deduces any and all relevant information that is implicitly contained in the natural language input text. The similarity measuring module calculates a numeric similarity score for each one of the plurality of categories and applies a dynamic threshold to the plurality of categories to ascertain which categories are potentially most similar to the natural language input text.

A domain specific knowledge base comprising a lexicon of keywords, a class hierarchy organization for keywords and a class hierarchy organization for categories is utilized by the text classification system of the present invention. The knowledge base is provided by the external application that is utilizing the text classification system of the present invention. By allowing keyword and category classes, the present invention simplifies the maintenance of the lexicon and an optional rule base. Accuracy is also improved by allowing multiple facts to be inferred from single keyword classes.

An optional category disambiguation module can be added to the system of the present invention to further refine the results obtained by the similarity measuring module. Under such circumstances, the domain specific knowledge base can be adapted to include the optional rule base. By making the category disambiguation module and the rule base optional, the present invention provides a text classification application developer more flexibility by allowing the developer to decide whether or not to include the rule base. While eliminating the category disambiguation module and the rule base may result in some loss of accuracy, the trade-off would be that development of an application is greatly simplified.

If, however, an application developer decides to utilize the category disambiguation module and the rulebase, the task is simple and straightforward because most of the processing and comparison of the input text is performed upstream in the architecture thereby greatly reducing the importance of the rule-base in the text classification process.

The system of the present invention can also be adapted to include an optional relevance feedback learning module as an add-on to the system of the present invention to learn over time to increase system accuracy. It can operate independently of the text classification system, e.g., in a batch mode. The relevance feedback learning module utilizes information passed to it by the system to adjust values stored in a category profile knowledge base. Such information may include a category determined most relevant to a given natural language input text, a category determined most relevant to the same natural language input text by an external source, e.g., a human expert, (the categories may or may not be the same), and a list of keywords that provide evidence for the categories selected along with the amount of evidence they provide.

DETAILED DESCRIPTION

Figure 1:
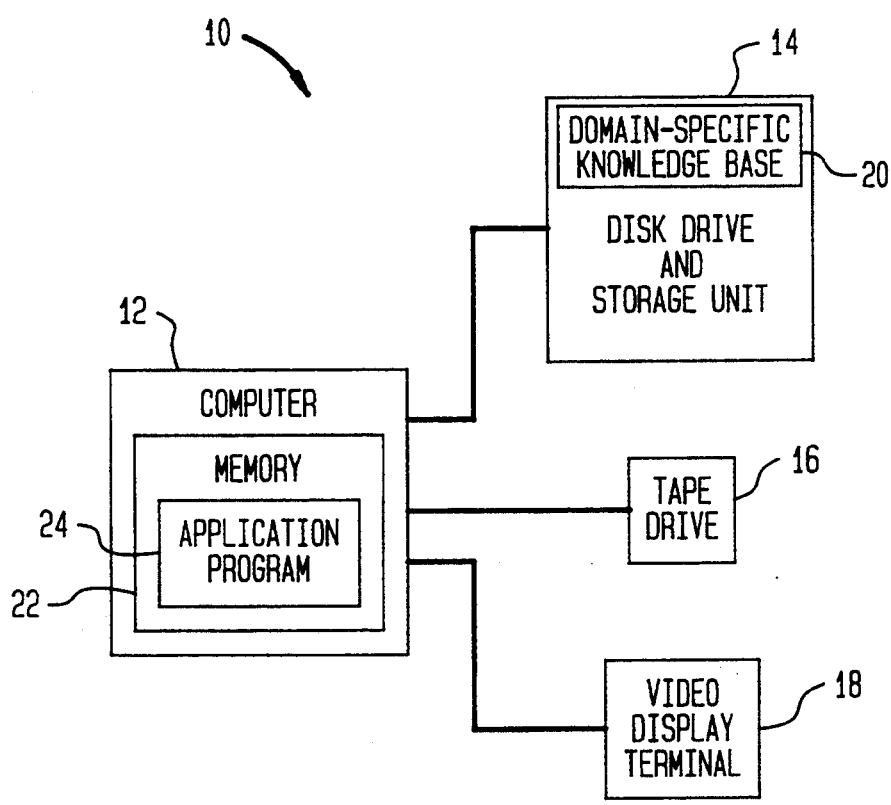
FIG. 1 illustrates an exemplary computer system for implementing a text classification system according to the present invention.

Referring now to the drawings, and initially to FIG. 1, there is illustrated an exemplary embodiment of a system for implementing the present invention. The system 10 comprises a computer 12 having a memory 22 associated therewith and with associated peripheral equipment such as a disk drive and storage unit 14, a tape drive 16 and a video display terminal 18. The computer 12 is generally any high performance computer such as a Digital Equipment Corporation VAX 6000-100. In conjunction with the computer 12, a domain specific knowledge base 20 that includes application-specific information is stored on the disk drive 14 and an application program 24 is stored in the memory 22.

Figure 2:
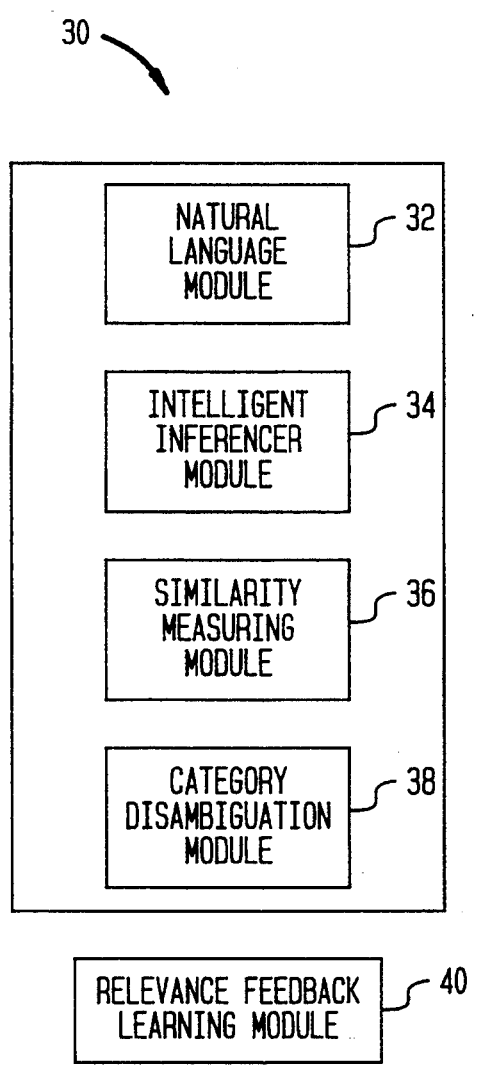
FIG. 2 illustrates an exemplary architecture of the modules utilized in a text classification system according to the present invention.

Referring now to FIG. 2, there is illustrated an exemplary architecture for a text classification system 30 of the present invention. The system 30 comprises a natural language module 32, an intelligent inferencer module 34 and a similarity measuring module 36. An optional category disambiguation module 38 and an optional relevance feedback learning module 40 are also shown in FIG. 2. Modules 32, 34 and 36 (and 38, if selected to be part of the system) comprise what is hereinafter referred to as "the run time system" of the present invention. These modules are referred to as the run time system because collectively, they are invoked by the computer 12 (FIG. 1) to process and classify natural language text received from an external source, e.g., the application 24.

Figure 3:
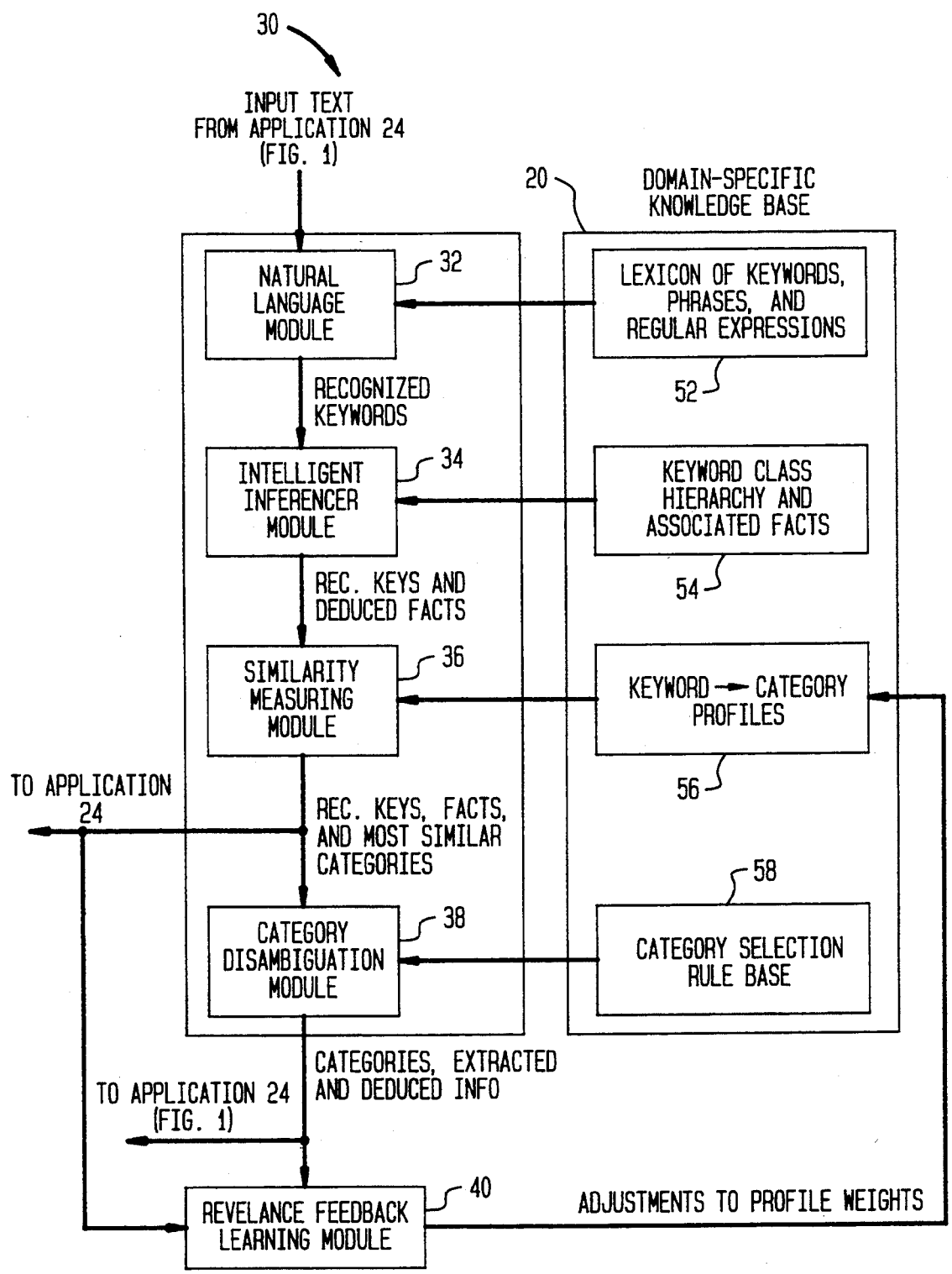
FIG. 3 shows the exemplary architecture illustrated in FIG. 2 together with an exemplary domain specific knowledge base.

FIG. 3 illustrates the system 30 of FIG. 2 with the domain specific knowledge base 20 of FIG. 1. As illustrated in FIG. 1, the knowledge base 20 is shown as being stored on the disk drive 14. It should be understood that it could also be stored in the memory 22 (FIG. 1) or any other appropriate storage device coupled to the computer 12. The knowledge base 20 is external to the system 30. The information stored in the knowledge base 20 is provided by an applications programmer who is charged with developing the application 24 that is utilizing the system 30 to perform text classification functions. The modules which comprise the domain specific knowledge base 20 are a lexicon 52, a keyword class hierarchy 54, keyword/category profiles 56 and an optional category selection rule base 58 (utilized when the optional category disambiguation module 38 is used).

Each of the modules of the system 30 and the components of the knowledge base 20 are briefly discussed below.

The main function of the natural language module 32 is to extract as much information as possible directly from natural language input text. The input text can be any machine-readable natural language text as determined by the external application 24. The natural language module 32 uses the lexicon 52, which comprises keywords which can include, for example, words, phrases, and regular expressions, to identify all recognized keywords in the natural language input text. Specifically, the module 32 extracts all the relevant information that is explicitly contained in the input text. The natural language module 32 passes a list of all the recognized keywords to the intelligent inferencer module 34.

An example of a natural language module of the type described above is disclosed in U.S. patent application Ser. No. 07/729,445, entitled "Method and Apparatus for Efficient Morphological Text Analysis using a High Level Language for Compact Specification of Inflectional Paradigms," (hereinafter "the Morphological Text Analysis patent application") filed Jul. 12, 1991 and assigned to Digital Equipment Corporation. This application is expressly incorporated herein by reference.

The list of recognized keywords passed to the intelligent inferencer module 34 is used to deduce any and all relevant information that is implicitly contained in the input text. To accomplish this task, the intelligent inferencer module 34 uses the keyword class hierarchy 54 to deduce further facts from the information explicitly stated in the input text. Keywords are grouped into classes in the keyword class hierarchy 54. Each class has associated facts that are true when a member of the class is identified in the input text.

For example, the input text may mention problems with a specific type of disk device but not explicitly mention that the problems are with a disk. The keyword class hierarchy 54 can include a class called "DISK DEVICES" with specific disks as members. The fact "(DEVICE TYPE=DISK)" can be attached to this class. When a specific disk device is identified, the fact "(DEVICE TYPE=DISK)" can be inferred even though the word "disk" was not explicitly mentioned in the input text. The intelligent inferencer module 34 also performs word substitutions in key phrases. The intelligent inferencer module 34 passes the list of recognized keywords and a list of all the extra facts that could be deduced from the recognized keywords to the similarity measuring module 36.

The list of recognized keywords extracted from the input text passed to the similarity measuring module 36 is used to calculate a numeric similarity score for each predefined category. Each score indicates how similar a given category is to the input text. The similarity measuring module 36 uses a knowledge base of keyword/category profiles 56 to determine the similarity score. Each category in the knowledge base of keyword/category profiles 56 has an associated profile. The profile tells the similarity measuring module 36 which keywords provide evidence for the given category. Associated with each keyword in a profile is a numeric weight called a "profile weight" that tells the similarity measuring module 36 the amount of evidence a keyword provides for the given category. The module 36 determines profile weights and combines the profile weights to arrive at similarity scores for all the categories. Once the similarity scores have been calculated, a dynamic threshold is applied to all of the categories defined in the domain specific knowledge base 20. Those categories whose similarity scores are below the threshold are discarded from consideration as being potentially most similar to the input text. The categories whose similarity scores are above the threshold are compiled into a list and are passed to the next module or directly to the external application 24 (not shown), along with the list of extracted keywords and the list of deduced facts, if there are any.

The list of most similar categories, the list of extracted keywords, and the list of deduced facts, if any, can then either be passed directly out to the external application 24, to the optional category disambiguation module 38 or to the optional relevance feedback learning module 40. If a rule base is desired for a particular application, the information is passed to the category disambiguation module 38. The module 38 uses the category selection rule base 58 to select certain categories over other categories based on the list of recognized keywords and the list of deduced facts. This module 38 further refines the list of the most similar categories and passes it, along with the list of recognized keywords and the list of deduced facts to the external application 24 and, if desirable, the optional relevance feedback learning module 40.

The relevance feedback learning module 40 is an add-on to the run time system of the present invention. It can operate independently of the run time system, e.g., in a batch mode. The input to the relevance feedback learning module 40 comprises the category determined most relevant to a given input text, the category determined most relevant to the same input text by an external source, e.g., a human expert, (the categories may or may not be the same), and the list of recognized keywords that provide evidence for the categories selected along with the amount of evidence they provide. The module 40 then takes this information and adjusts the profile weights in the keyword/category profiles 56 accordingly.

The task that the natural language module 32 of the run time system of the present invention performs is to extract all the relevant information that is explicitly contained in a natural language input text. To accomplish this task, the module 32 uses the lexicon 52. The lexicon 52 contains all the information that is considered relevant for extraction purposes.

A brief description of the processing performed by the natural language module 32 is set forth below. For a complete description, the reader is referred to the Morphological Text Analysis patent application, referred to above, which is expressly incorporated herein by reference.

The natural language module 32 allows the inclusion of single word nouns and multiple word noun phrases into the lexicon 52. The natural language module 32 will recognize the root form of a noun or noun phrase as well as morphological variants of the root, e.g., plural form of the root noun or noun phrase. It also allows synonyms of a keyword to be entered into the lexicon 52 which are useful when defining keyword classes or when writing disambiguation rules.

Single word verbs can also be included in the lexicon 52. The root form of a verb must be entered into the lexicon 52. This way, the module 32 will not only recognize the root form, but morphological variants as well. For example, the verb "crash" in the lexicon 52 will identify "crashes", "crashing", and "crashed".

A limited form of multiple word verb phrases are allowed into the lexicon 52. In this case, a verb phrase is considered to be a single word verb combined with a single word noun or noun phrase subject/object (e.g., "Analyze Disk").

When keyword matching is performed for a verb phrase, each sentence in the input text is reviewed separately. For each sentence, the natural language module 32 tries to find the verb contained in the verb phrase. If the verb is found, it then looks to see if the noun or noun phrase contained in the verb phrase is present in the sentence. If both the verb and the noun phrase are found in the same sentence, then the entire verb phrase has been identified. For example, if the lexicon 52 contains the verb phrase "Analyze Disk." One of the sentences in the input text that the present invention is parsing is the following: "I need help analyzing this damaged disk." The natural language module 32 will first identify the single keywords "analyze" and "disk" (analyzing is a morphological variant of analyze). Then it will notice that "analyze" is the verb part of a verb phrase. It will then search the list of recognized keywords for that sentence for the noun part of the phrase (in this case the word "disk"). Since "disk" is in the keyword list the present invention then identifies the verb phrase "Analyze Disk." The process works exactly the same way for multiple word noun phrases inside the verb phrase (e.g., "Analyze Process Dump," instead of "Analyze Disk").

The lexicon 52 can also include single word regular expressions. If a regular expression is in the lexicon 52, then the natural language module 32 will identify any word in the input text that matches against the regular expression. Being able to define regular expressions in the lexicon 52 gives the maintainer of the lexicon 52 more flexibility than being restricted to defining literal words and phrases. For example, the term "SYS$:n+" can be defined to match all the VMS (an operating system available from Digital Equipment Corporation) operating system service routines instead of having to enter the name of every operating system service routine directly into the lexicon 52.

Some of the syntax rules of the singular expressions allowed in the lexicon 52 are that an ordinary character matches that character; a period matches any character; a colon matches a class of characters described by the following character, e.g., ":a" matches any alphabetic, ":d" matches digits, ":n" matches alphanumerics; an expression followed by an asterisk matches zero or more occurrences of that expression e.g., "fo*" notches "f" "fo" "foo", etc. and an expression followed by a plus sign matches one or more occurrences of that expression, e.g., "fo+" matches "foo, etc."

The output of the natural language module 32 is a list which is a collection of sublists where each sublist corresponds to a single sentence in the input text and contains all the recognized keywords in that sentence. This list is passed to the intelligent inferencer module 34 for further analysis and possible augmentation as is described below.

Figure 4:
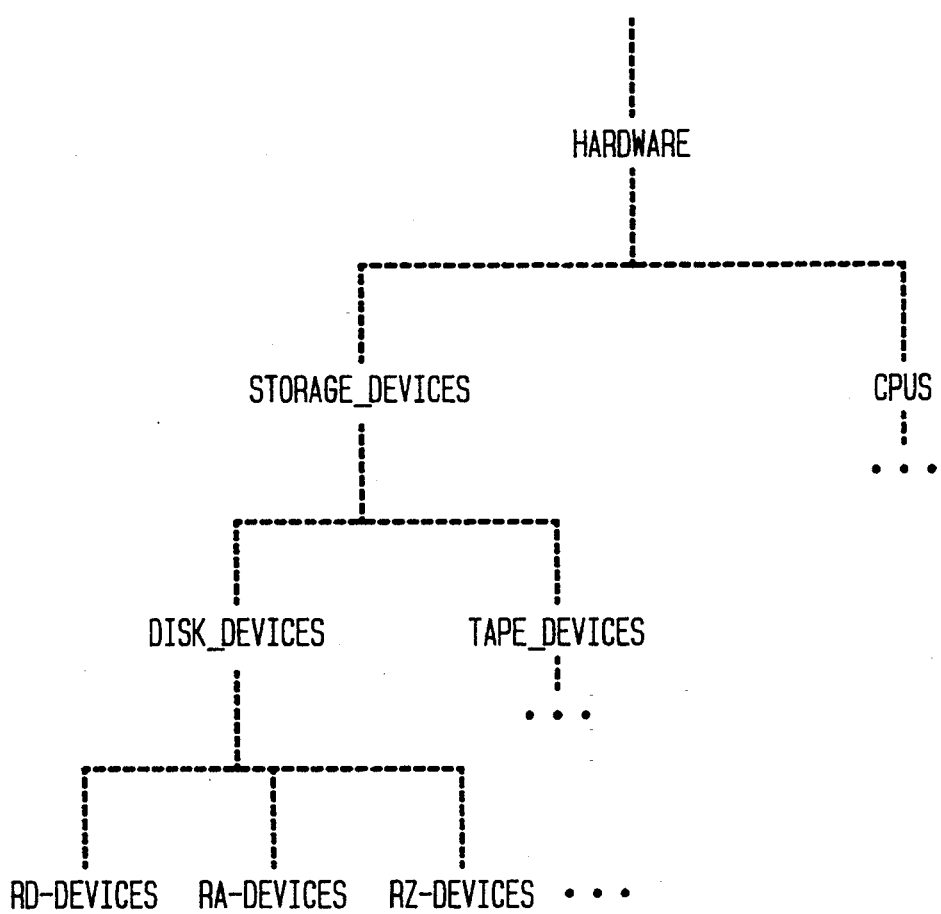
FIG. 4 illustrates an exemplary portion of the keyword class hierarchy.

The intelligent inferencer module 34 takes the information extracted directly from the input text by the natural language module 32 and attempts to add to that information by deducing further facts that are implied by the keywords identified. This module 34 uses the keyword class hierarchy 54. Each class in the keyword class hierarchy 54 contains a group of keywords (already defined in the lexicon 52) that share something in common. The classes are structured into a hierarchy such that classes themselves can be members of other classes. An exemplary portion of the keyword class hierarchy 54 is illustrated in FIG. 4.

What is useful about these classes is that facts can be attached to them to deduce implied information if a member of a class is found in the input text. If a keyword class member is identified, then all the facts attached to that class are inferred and added to the list of deduced facts. In addition, all the facts attached to the parent classes are inferred and added to the list of deduced facts as well.

In addition to inferring new facts with keyword classes, more general descriptions of an identified keyword can be substituted in an attempt to match other key phrases. This process is called "keyword substitution." It is an attempt to match key phrases in the lexicon 52 that could not be matched explicitly. For example, it may be desirable to match the phrase "Analyze Disk" every time "Analyze X" is detected, where X is a specific disk device. This is accomplished without having to enter a single verb phrase for every specific disk device into the lexicon 52 which would cause the maintenance of a lexicon to become problematic.

Using keyword substitution, a group of like devices can be grouped into a class and a word attached to the class to be used as a substitute for matching phrases in the lexicon 52. Going back to the example above, a class of disk devices can be defined and the keyword "disk" can be associated as a substitute. This way, "Analyze RD54" (where RD54 is a model number of a disk drive) can be recognized as "Analyze Disk" without having to have "Analyze RD54" stored in the lexicon 52.

The output of the intelligent inferencer module 34 is the list of all the extracted keywords and the list of all the deduced facts that the intelligent inferencer module 34 was able to infer. Associated with each extracted keyword is a number designating the frequency of the keyword in the input text.

Figure 5:
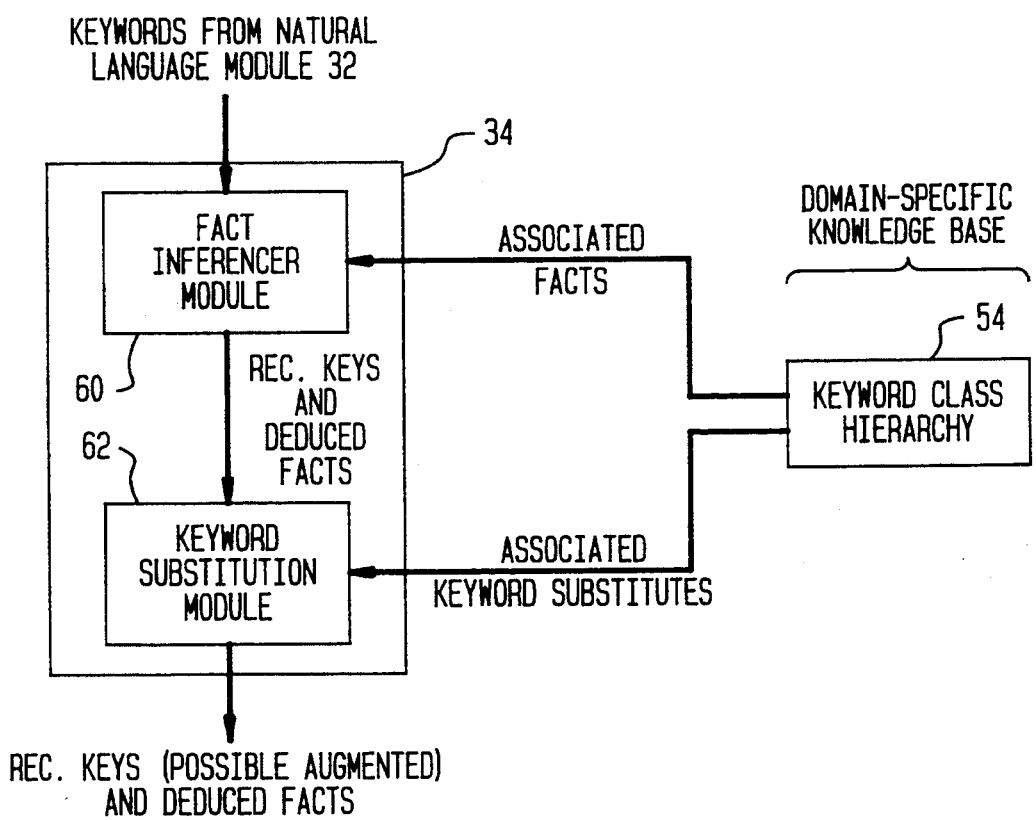
FIG. 5 illustrates an exemplary embodiment of the modules that comprise the intelligent inferencer module illustrated in FIG. 2.

An exemplary embodiment of the modules which comprise the intelligent inferencer module 34 are shown in FIG. 5. The left hand side of FIG. 5 shows the two main modules of the intelligent inferencer module 34, a fact inferencer module 60 and a keyword substitution module 62. The right hand side of FIG. 5 shows that both modules 60 and 62 use the keyword class hierarchy 54 (the same one illustrated in FIG. 3) as their knowledge base. The fact inferencer module 60 only utilizes the facts associated with the classes in the keyword class hierarchy 54 and the keyword substitution module 62 only uses the keyword substitutes associated with the classes in the keyword class hierarchy 54.

The fact inferencer module 60 follows a general method for attaching facts to keywords. This method, which is repeated for each keyword K, first searches the keyword class hierarchy 54 for all classes C, of which the identified keyword is a member. Then, all facts associated with C are added to a global list of deduced facts for each identified class C that K is a member. The step of adding all facts associated with the identified class C is then applied recursively on all of the parent classes of C. By following this method, the fact inferencer module 60 adds facts to the list of deduced facts.

The keyword substitution module 62 similarly follows a general method for substituting keywords. This method, which is repeated for each keyword K, first searches the keyword class hierarchy 54 for all classes C, of which K is a member. Then, all the substitution keywords S, associated with C are retrieved for each identified class C where K is a member. Then, S is substituted for K and an attempt is made to match verb phrases in the lexicon 52. If a match is found, it is added to a global list of identified keywords. Then, the steps of retrieving substitution keywords and substituting keywords are recursively applied on all of the parent classes of C.

The similarity measuring module 36 is responsible for returning a numeric similarity score for each category in the keyword/category profile 56. Each score indicates how similar a given category is to the recognized keywords extracted from the natural language input text. The similarity measuring module 36 uses the knowledge base of keyword/category profiles 56 to determine similarity scores for all of the categories defined. Each category in the keyword/category profiles 56 has its own profile containing the keywords that are relevant to that category. Once the input text is parsed by the natural language module 32 and the intelligent inferencer module 34, a list of all the keywords present in the input text, as well as the number of times they occur in the input text called term frequency, is assembled by the similarity measuring module 36. The category profile can be represented as a n-dimensional vector of the form C=(c1, c2, ..., cn), where n equals the total number of possible keywords in the lexicon 52 and the individual elements "ci" represents the corresponding profile weight of keyword "i" in the category profile. The input text can also be represented as a n-dimensional vector of the form T=(t1, t2, ..., tn), where n is as above and "ti" represents the corresponding weight of keyword "i" in the input text. Similarity between a category and an input text can then be measured as the inner product between these corresponding vectors, which is defined as:

$$Sim(C,T) = SUM(i=1,n) \ (ci * ti).$$

The size of n can vary depending on the size of the keyword lexicon 52.

The similarity measuring module 36 includes a method for efficiently computing the inner product similarity measure so that when n becomes large the similarity measures can still be quickly calculated. The method assumes that each keyword in the lexicon 52 has a corresponding vector of categories that it provides evidence for and a profile weight for each category. This information can be quickly computed from the category profile vectors described above. This is accomplished by first initializing all similarity scores for all categories to zero. Then, for each keyword i identified in the input text and for each category j in the category vector of the keyword i, the keyword weight of keyword i is multiplied by the profile weight of category j. Then, the resulting product is added to the similarity score for the category j.

The foregoing method insures that only the identified keywords and the categories they provide evidence for are being multiplied together. All the other portions of the inner products will equal zero anyway since the keyword weights will be zero (i.e., the keywords were not identified in the input text). The run time performance of this method is significantly better than performing a straight summation of the products of the vector elements because of the large number of elements equaling zero in the vectors.

Like keywords, categories can also be grouped into hierarchically structured classes. This feature allows a lexicon maintainer to define category class profiles as well as category profiles. The run time system of the present invention automatically translates category class profiles into individual category profiles and incorporates them into existing category profiles. Category classes are also useful when writing disambiguation rules. By having category classes, a single rule can operate on an entire class rather than writing individual rules for each category in a class.

The initial weights for category profiles and keyword weights for input texts are ascertained by formulae used by the similarity measuring module 36 that uses both term frequency and collection frequency as input. In text classification terms, collection frequency is the number of category profiles in which a specific keyword occurs. The profile weight calculation formula is as follows:

$$PW = log(CAT/CF)$$

where CAT equals the total number of defined categories and CF equals the collection frequency of the given keyword (this formula uses only collection frequency). Note that as CF increases, the profile weight decreases. This makes sense because if a keyword provides evidence for a large number of categories then its profile weight should be lower than a keyword that provides evidence for a small number of categories.

The keyword weight calculation formula is as follows:

$$KW = (TF * log(CAT/CF))/CKW$$

where CAT and CF are as above, TF equals the term frequency of the keyword in the input text, and CKW is the combined keyword weight and is calculated as follows:

$$CKW = SQUARE\_ROOT(SUM(i=1, n) \\ (SQUARE(tf * log(CAT/cf))))$$

where n is the total number of keywords found in the input text, "tfi" and "cfi" are the term and collection frequencies for one of the found keywords, and CAT is as previously defined.

Once similarity scores have been calculated for all categories, the similarity measuring module 36 applies a dynamic threshold to the list of categories. This threshold is a given tuneable offset from the similarity score of the most similar category. In other words, if N is the highest similarity score for the input text and M is the pre-defined threshold offset, then N−M is the threshold value. All categories whose similarity scores are below the threshold value are discarded and those above the threshold value are compiled into a list and passed to the next module, along with the list of recognized keywords and the list of deduced facts.

As described above, the foregoing results can be passed directly to the external application 24, to the relevance feedback learning module 40 or the category disambiguation module 38. If the information is passed to the optional category disambiguation module 38, it uses a rule base to select certain categories over other categories based on the list of recognized keywords and the list of deduced facts. Rules are utilized to decide the appropriate category when more than one category is a potential candidate for being the most similar. The left hand sides of the rules consist of CATEGORY and KEYWORD slot-value pairs and deduced facts. The right hand sides of the rule merely assert a preselected preference for one category over another category (or set of categories).

An example of a rule that could be used by the category disambiguation module 38 is set forth below.

| | |
|---|---|
| IF: | (CATEGORY = VM-FILE-SYSTEM) |
| | (CATEGORY = ?X = (one-of DECNET-VAX VMS-TAPE)) |
| | (DEVICE_TYPE = DISK) |
| | (KEYWORD = "ACP") |
| THEN: | PREFER VMS-FILE-SYSTEM OVER ?X |

This rule states that if VMS-FILE-SYSTEM and either DECNET-VAX or VMS-TAPE are potentially most similar categories, and if the fact (DEVICE_TYPE=DISK) was deduced by the intelligent inferencer module 34, and if the keyword ACP has been found (or one of its synonyms); then the category VMS-FILE-SYSTEM will be preferred over either DECNET-VAX or VMS-TAPE.

When the category disambiguation module 38 is invoked, all the rules that can apply to the given input text are fired and all the category preferences are recorded by the category disambiguation module 38. As a result of the firing of the rules, the list of categories whose similarity scores are above the threshold value is modified to include only the most similar categories that do not have any other category with preference over them. This list, along with the list of recognized keywords and the list of deduced facts, is then passed to the application 24 (and to the relevance feedback learning module 40).

As described above, the category disambiguation module 38 is detachable from the run time architecture of the present invention. If a particular text classification application has no heuristics for category selection, then the category disambiguation module 38 can be bypassed and reliance can be placed solely on similarity scores calculated by the similarity measuring module 36, to determine the most similar category. Detaching the rule base will most likely result in a decrease in the accuracy of the classification; but for some applications no such rule base exists. By making the rule base detachable, the range of potential applications that can be developed using the present invention is increased.

Figure 6:
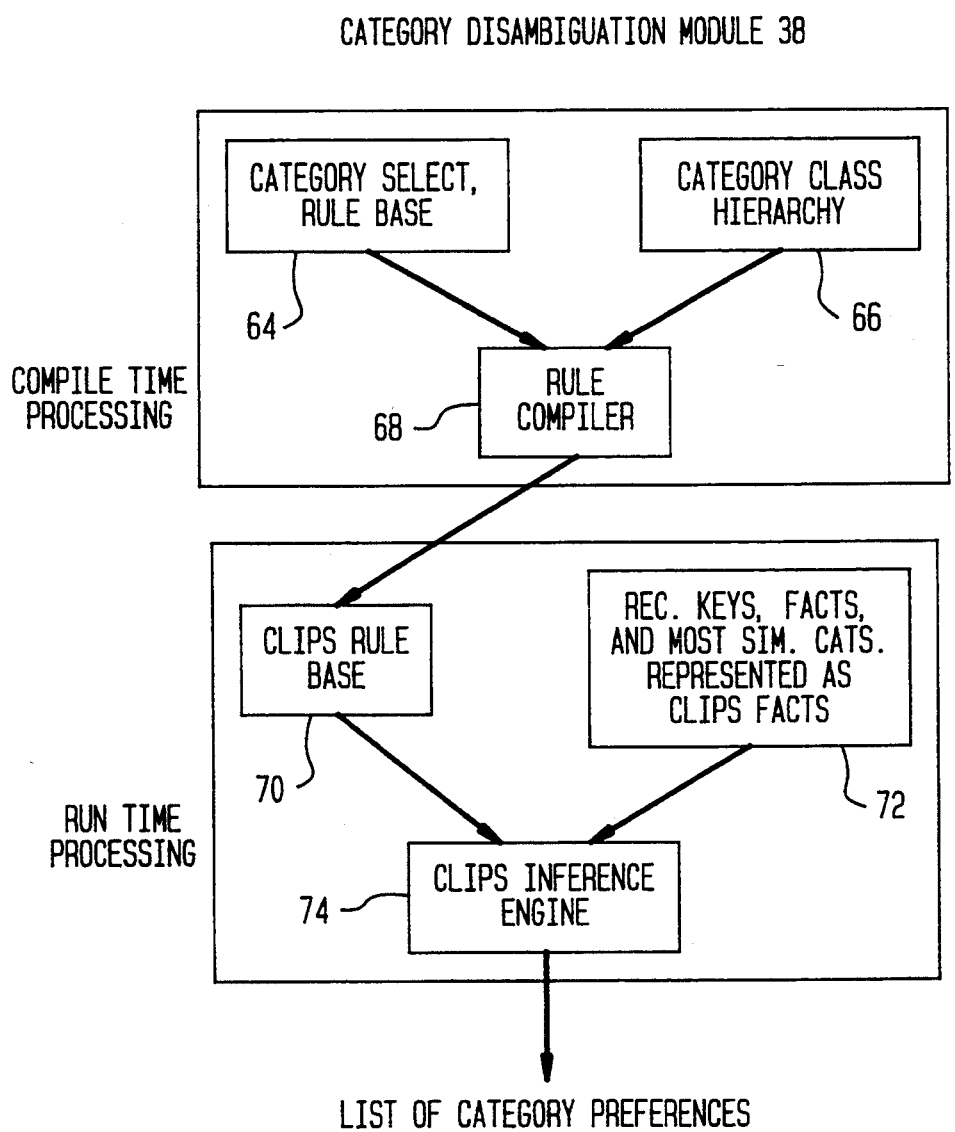
FIG. 6 illustrates an exemplary implementation of the category disambiguation module illustrated in FIG. 2.

An exemplary implementation of the category disambiguation module 38 is illustrated in FIG. 6. The top portion of FIG. 6 shows the compile time processing needed to translate the category selection rule base 58 into the proper syntax for a run time inference engine, such as "CLIPS," which is a public domain inference engine developed by NASA. A rule compiler 68 takes as input a category selection rule base 64 and category class hierarchy 66. At run time, all the recognized keywords, facts, and most similar categories (that are given as input to the category disambiguation module) are translated into CLIPS facts 72 and are given as input (along with a CLIPS rule base 70) to the CLIPS inference engine 74. The CLIPS inference engine 74 fires as many rules as it can against the given facts. Each rule firing returns a category preference. Once all the rules that can fire have fired, then all the category preferences are collected and used by the present invention to come up with a final list of most similar categories (as described above).

Once text classification is done and the information is passed to the external application 24 for further application specific processing, the optional relevance feedback learning module 40 can be invoked to adjust the keyword/category profile weights to achieve better accuracy. The module 40 collects all the text classifications over a predetermined period from either the similarity measuring module 36 or the optional category disambiguation module 38, whichever is the last module of the run time system. The classifications include the input text, the chosen most similar category, and the keyword weights for the extracted keywords. Then, the relevance feedback learning module 40 performs the following tasks for each category profile in the keyword/category profiles 56. First, all the text classifications where the particular category was identified as the most similar are collected. Next, the input texts which were correctly classified and which were not are determined. Then, the keyword weights for all the correctly classified input texts are added to the corresponding keyword profile weights in the category profile. Finally, the keyword weights for all the incorrectly classified input texts are subtracted from the corresponding keyword profile weights in the category profile. Also, the correct category is determined and the keyword weights are added to the profile of that category. An example of an application that may use the text classification system of the present invention is routing of customer service requests within a customer support center. Without an automated text classifier, human call screeners interact with a call handling system and determine the appropriate group to send a customer service request. A call handling system records all the pertinent information that a support specialist needs to solve the customer problem. With an automated text classifier, the call handling system can automatically invoke the text classification system of the present invention to determine where to route the customer service request without human intervention.

The following section provides an example of a call handling application for a given customer service request and shows how the individual modules of the text classification system of the present invention operate on the customer service request. The output of the text classification system enables the application to route the customer service request to the appropriate group. Although not shown here because it is application specific processing, the call handling system would take this output and automatically send the customer service request to the identified support group.

Set forth below is an explanation of the processing performed by the system of the present invention using an example natural language text input. The example text input is:

"While trying to backup my database to a TK70, the process died with the error AIJDISABLED and produced a dump file. I need help analyzing the dump file and getting the backup to work."

This input text is passed to the run time system by the external application 24 in machine readable form. The following explanation demonstrates how the present invention processes this input text.

As discussed above, the processing begins with the natural language module 32. The natural language module 32 utilizes the lexicon 52 to recognize words or phrases in the natural language input text. Set forth below is an example of entries in the lexicon 52. Each entry in the lexicon 52 has a corresponding identifier which defines the entry type. For example, "BACKUP" is identified as a verb and a noun in separate entries.

| | |
|---|---|
| BACKUP | VERB |
| BACKUP | NOUN |
| DATABASE | NOUN |
| AIJDISABLED | NOUN |
| DUMP FILE | NOUN PHRASE |
| ANALYZE DUMP | VERB PHRASE |
| TK:D:D+ | REGULAR EXPRESSION |

Given the entries in the lexicon 52, the natural language module 32 identifies the following keywords and phrases from the given natural language input text:

backup (twice, once as a verb and once as a noun), database, AIJDISABLED, TK70 (matched against the regular expression), dump file, and analyze dump. Two interesting events happen in the recognition of the verb phrase, "analyze dump." The first is that a morphological variant of the verb "analyze" is identified ("analyzing" being the morphological variant). The second is that the phrase was recognized as a single unit even though the two words that comprise it were not contiguous in the input text. As previously described, the natural language module 32 identifies the verb portion of the verb phrase and then looks for an occurrence of the noun portion in the same sentence. In this case it was successful, so the entire verb phrase matches. The list that the natural language module 32 outputs as a data structure to the intelligent inferencer module 34 as the result of parsing this input text would look something like this:

| (($1: | ("BACKUP" 1) ("DATABASE" 1) |
| | ("TK-DEVICE" 1) |
| | ("AIJDISABLED" 1) ("DUMP FILE" 1)) |
| (($2: | ("ANALYZE DUMP" 1) ("BACKUP" 1)). |

The numbers with each identified keyword represent the frequency of the keyword in the given sentence. This data structure is passed as input to the intelligent inferencer module 34.

The intelligent inferencer module 34 uses class information to deduce further information from the input text. For the purposes of this example, the following classes are defined to reside in the keyword class hierarchy 54:

Keyword Class TAPE-DEVICES, which is a grouping of all specific tape devices and includes "TK70", Keyword Class RDB-ERROR-MSGS, which is a grouping of all the error messages generated by the product RDB, and includes "AIJDISABLED", Keyword Class ERROR-MSGS, which is a grouping of all possible error messages and includes the keyword class RDB-ERROR-MSGS, Category Class VIA-PRODUCTS, which is a grouping of all the VIA products, including RDB (RDB is a category in the domain-specific knowledge base).

The following facts are associated with the above classes in the keyword class hierarchy 54:

| (CLASS = TAPE-DEVICE) | → (DEVICE-TYPE = TAPE), |
| (CLASS = RDB-ERROR-MSGS) | → (LAYERED-PROD = RDB), |
| (CLASS = ERROR-MSGS) | → (ERROR-MESSAGE = $keyword). |

Given these classes and associated facts, it can be deduced that the DEVICE-TYPE is TAPE because of the identification of TK70. A potential layered product is RDB because of the identification of AIJDISABLED as a RDB error message. An error message found in this input text is AIJDISABLED.

The list of recognized keywords and the list of deduced facts output by the intelligent inferencer module 34 as a data structure would look something like this:

| ((KEYWORDS: | ("BACKUP" 2) ("DATABASE" 1) |
| | ("TK-DEVICE" 1) ("AIJDISABLED" 1) |
| | ("DUMP FILE" 1) ("ANALYZE DUMP" 1)) |
| (FACTS: | (DEVICE-TYPE: TAPE) (LAYERED-PROD: RDB) (ERROR-MESSAGE: AIJDISABLED))). |

Notice that the keywords are now not separated into sentence groupings and that the information deduced by the intelligent inferencer module 34 is incorporated into the data structure. This data structure is passed as input to the similarity measuring module 36.

The similarity measuring module 36 calculates a similarity measure for every category in the keyword/category profiles 56 against the identified keywords in the data structure. At this point, the frequency numbers associated with each keyword will be replaced by their term weights by using the term weighing formulae previously described. To keep things simple in this example, it is assumed that the term weights remain as they are above. For this example, the following category profiles contained in the keyword/category profiles 56:

| Category BACKUP | has the associated keyword "BACKUP" |
| Category RDB | has the associated keywords "DATABASE" and "AIJDISABLED" |
| Category DBMS | has the associated keyword "DATABASE" |
| Category TAPE | has the associated keyword "TK-DEVICE" |
| Category BUGCHECK | has the associated keywords "DUMP FILE" and "ANALYZE DUMP" |

It is assumed for this example that each keyword for each category has a weight of 1. It is also assumed that there are other categories in the knowledge base, but that none of them have any keywords in their profiles that match the keywords found in the input text. Also, it should be understood that the categories above have other keywords in their profiles, but for simplicity, only the keywords that match keywords found in the input text are presented. The similarity measures for the categories above are then as follows:

| Sim(T, BACKUP) = | 2 (because "BACKUP" has a keyword weight of 2) |
| Sim(T, RDB) = 2 | |
| Sim(T, DBMS) = 1 | |
| Sim(T, TAPE) = 1 | |
| Sim(T, BUGCHECK) = 2 | |

For this example, a category threshold offset of 0.5 is chosen. This means that only the categories with similarity measures above 1.5 (2−0.5) will pass on to the next module. The list of the most similar categories, along with the list of recognized keywords and the list of deduced facts, that the similarity measuring module 36 outputs as a data structure would look something like this:

| ((KEYWORDS: | ("BACKUP" 2) ("DATABASE" 1) |
| | ("TK-DEVICE" 1) ("AIJDISABLED" 1) |
| | ("DUMP FILE" 1) (*ANALYZE DUMP" 1)) |
| (FACTS: | (DEVICE-TYPE: TAPE) (LAYERED- |

```
                    PROD: RDB) (ERROR-MESSAGE:
                    AIJDISABLED))
(CATEGORIES:   (BACKUP 2) (RDB 2) (BUGCHECK 2))).
```

To continue the example, a rule base is selected. There are two rules in the category selection rule base 58 as follows:

```
IF   (KEYWORD = "BACKUP") and
     (LAYERED-PROD = VIA-PRODUCTS)
THEN (PREFER VIA-PRODUCTS OVER BACKUP)
IF   (SKILL = BUGCHECK) and
     (LAYERED-PROD = VIA-PRODUCTS)
and
     (NOT (EXISTS BUGCHECK-TYPE))
THEN (PREFER VIA-PRODUCTS OVER BUGCHECK)
```

These two rules use the class VIA-PRODUCTS which we defined previously as including the category RDB. Since the fact (LAYERED-PROD=RDB) is present, both of these rules will fire, the result being that the RDB category is preferred over both BACKUP and BUGCHECK. The final data structure output by the category disambiguation module 38, is as follows:

```
((KEYWORDS:    ("BACKUP" 2) ("DATABASE" 1)
                ("TK-DEVICE" 1) ("AIJDISABLED" 1)
                ("DUMP FILE" 1) ("ANALYZE DUMP"
                1))
(FACTS:        (DEVICE-TYPE: TAPE) (LAYERED-
                PROD: RDB) (ERROR-MESSAGE:
                AIJDISABLED))
(CATEGORIES:   (RDB 2))
(PREFERENCES:  (RDB OVER BACKUP RULE-1) (RDB
                OVER BUGCHECK RULE-2))).
```

The rule numbers are listed with the preferences so they can be accessed at run time to generate explanations to the user as to why the rules fired.

Once a text classification operation is performed, control is returned to the invoking application, in this case a call handling system. The call handling system will then use the classification to route the customer service request to the appropriate support group. The call handling system can also store the service request and its classification for later use by the relevance feedback learning module 40 (FIG. 2). After a given predetermined period of time, the call handling system collects all the service requests and their classifications and passes them as input to the relevance feedback learning module 40. The relevance feedback learning module 40 takes these classified requests and interacts with a human call routing expert via video display terminal 18 (FIG. 1) to determine which ones were correctly and which ones were incorrectly routed. This learning module would then take the information from the call routing expert and adjust the profile weights in the keyword/category profiles 56 as previously described.

What is claimed is:

1. A method for classifying natural language text input into a computer system, the system includes memory having a domain specific knowledge base having a plurality of categories stored therein, the method comprising the steps of:
   (a) accepting as input natural language input text;
   (b) parsing the natural language input text into a first list of recognized keywords;
   (c) using the first list to deduce further facts from the natural language input text;
   (d) compiling the deduced facts into a second list;
   (e) calculating a numeric similarity score for each one of the plurality of categories in the knowledge base to indicate how similar one of the plurality of categories is to the natural language input text;
   (f) applying a dynamic threshold to determine which ones of the plurality of categories are most similar to the recognized keywords of the first list, comprising the sub-steps of:
      (I) calculating a value for the dynamic threshold based upon a similarity score of a most similar category and a predefined threshold offset, and
      (II) classifying the categories based upon their respective similarity scores by discarding categories whose similarity scores are below the threshold value;
   (g) compiling the ones of the plurality of categories determined to be most similar in step (f) into a third list; and
   (i) passing the first list, the second list and the third list to an external application.

2. The method according to claim 1 wherein the keywords comprise words, phrases and regular expressions.

3. The method according to claim 1 wherein the knowledge base includes a keyword class hierarchy structured such that keywords that share something in common are grouped into classes, each class has associated facts that are true when a member of the class is identified in the natural language input text, wherein the steps of using the first list to deduce further facts from the natural language input text and compiling the deduced facts into a second list further are performed by the steps of:
   (a) searching the keyword class hierarchy to determine if a keyword identified in the first list is a member of a class in the keyword class hierarchy;
   (b) when a keyword identified in the first list is a member of a class,
      (i) inferring all the facts attached to that class by adding them to the second list, and
      (ii) adding all the facts attached to all classes above the classes of which the identified keyword is a member in the keyword class hierarchy to the second list; and
   (c) repeating steps (a) through (b) for each keyword in the first list.

4. The method according to claim 2 wherein the knowledge base includes a keyword class hierarchy structured such that keywords that share something in common are grouped into classes, each class has associated facts that are true when a member of the class is identified in the natural language input text, wherein the step of using the first list to deduce further facts from the natural language input text further comprises the step of substituting general descriptions of an identified keyword in the first list in an attempt to match other phrases that could not be matched explicitly so that a group of similar keywords can be grouped into a class and a word can be attached to the class to be used as a substitute for matching phrases.

5. The method according to claim 1 wherein the knowledge base includes a keyword class hierarchy structured such that keywords that share something in common are grouped into classes, each class has associated facts that are true when a member of the class is identified in the natural language input text, wherein the steps of using the first list to deduce further facts from the natural language input text and compiling the deduced facts into a second list further are performed by the steps of:
- (a) searching the keyword class hierarchy for all classes of which an identified keyword in the first list is a member;
- (b) adding all facts associated with each one of the classes of which the identified keyword is a member to a global list of deduced facts;
- (c) recursively applying step (b) on all classes above the classes of which the identified keyword is a member in the keyword class hierarchy; and
- (d) repeating steps (a) through (c) for each keyword in the first list.

6. The method according to claim 1 wherein the knowledge base includes a lexicon that includes words, phrases and expressions, and a keyword class hierarchy structured such that keywords that share something in common are grouped into classes, each class has associated facts that are true when a member of the class is identified in the natural language input text, wherein the step of using the first list to deduce further facts from the natural language input text further comprises the steps of:
- (a) searching the keyword class hierarchy for all classes of which an identified keyword in the first list is a member;
- (b) locating all substitution keywords associated with each class of which the identified keyword is a member;
- (c) retrieving the located substitution keywords;
- (d) substituting the located substitution keywords for the identified keyword;
- (e) using the located substitution keywords to identify matches between the located substitution keywords and phrases in the lexicon;
- (f) recursively applying steps (b) through (e) on all classes above the classes of which the identified keyword is a member in the keyword class hierarchy; and
- (g) repeating steps (a) through (f) for each keyword in the first list.

7. A text classification system comprising:
memory;
a domain specific knowledge base stored in said memory having a plurality of categories, the domain specific knowledge base includes a knowledge base of keyword/category profiles, each category in the keyword/category profiles knowledge base having an associated profile which indicates what information provides evidence for a given category, the keyword/profile weight knowledge base arranged to have associated with each keyword in a profile a profile weight that represents the amount of evidence a keyword provides for a given category; and
a computer coupled to the memory, the computer including:
a natural language module for accepting as input into the computer natural language input text, the natural language module includes means for parsing the natural language input text into a first list of recognized keywords;
an intelligent inferencer module for using the first list to deduce further facts from the information explicitly stated in the natural language input text, the intelligent inferencer module includes means for compiling the deduced facts into a second list;
a similarity measuring module for calculating a numeric similarity score for each one of the plurality of categories in the knowledge base to indicate how similar one of the plurality of categories is to the natural language input text, the similarity measuring module includes:
means for applying a dynamic threshold to determine which ones of the plurality of categories are most similar to the recognized keywords of the natural language input text, and
means for compiling the ones of the plurality of categories determined to be most similar into a third list; and
a relevance feedback learning module for adjusting the profile weights in the keyword/category profiles in the domain specific knowledge base based upon the ones of the plurality of categories determined most relevant to the natural language input text by the similarity measuring module and a second ones of the plurality of categories determined most relevant to the natural language input text by an external source.

8. A method for classifying natural language text input into a computer system, the system includes memory having a domain specific knowledge base having a plurality of categories stored therein, the method comprising the steps of:
- (a) accepting as input natural language input text;
- (b) parsing the natural language input text into a first list of recognized keywords;
- (c) using the first list to deduce further facts from the natural language input text;
- (d) compiling the deduced facts into a second list;
- (e) calculating a numeric similarity score for each one of the plurality of categories in the knowledge base to indicate how similar one of the plurality of categories is to the natural language input text;
- (f) applying a dynamic threshold to determine which ones of the plurality of categories are most similar to the recognized keywords of the first list, the step of applying a dynamic threshold further comprising the sub-steps of:
  - (1) calculating a value for the dynamic threshold based upon a similarity score of a most similar category and a predefined threshold offset, and
  - (2) classifying the categories based upon their respective similarity scores by discarding categories whose similarity scores are below the threshold value; and
- (g) compiling the ones of the plurality of categories determined to be most similar in step (f) into a third list.

9. The method according to claim 1 wherein the domain specific knowledge base further includes a rule base, the method further comprising the steps of:
- (a) utilizing the rule base to select certain ones of the plurality of categories determined to be most similar to the recognized keywords over other ones of the plurality of categories based on the first and second lists; and
- (b) modifying the third list of the most similar categories to include the certain ones of the plurality of categories selected.

10. The method according to claim 1 wherein the domain specific knowledge base includes a knowledge base of keyword/category profiles, each category in the keyword/category profiles knowledge base having an associated profile which indicates what information provides evidence for a given category, the keyword/profile weight knowledge base is arranged to have associated with each keyword in a profile a profile weight that represents the amount of evidence a keyword provides for a given category, the method further comprising the step of adjusting the profile weights in the keyword/category profiles in the domain specific knowledge base based upon the ones of the plurality of categories determined most relevant to the natural language input text and a second ones of the plurality of categories determined most relevant to the natural language input text by an external source.

11. A method for routing customer service requests by a computer system in a customer support center which includes support groups to service customer requests, the computer system including a call handling system, a text classification system and memory having a domain specific knowledge base having a plurality of categories stored therein representative of the support groups within the customer support center, each support group being identified by a name, the method comprising the steps of:

(a) receiving a customer service request by the computer system from the call handling system;

(b) passing the customer service request to the text classification system to determine where to route the customer service request within the customer support center;

(c) parsing the customer service request into a first list of recognized keywords;

(d) using the first list to deduce further facts from the customer service request;

(e) compiling the deduced facts into a second list;

(f) calculating a numeric similarity score for each one of the plurality of categories in the knowledge base to indicate how similar each one of the plurality of categories is to the the customer service request;

(g) applying a dynamic threshold to identify which one of the support groups should handle the customer service request by determining which ones of the plurality of categories are most similar to the recognized keywords of the customer service request;

(h) compiling the ones of the plurality of categories determined to be most similar in step (g) into a third list;

(i) passing the first list, the second list and the third list back to the call handling system; and (j) routing the customer service request to the identified one of the support groups.

12. A method for routing customer service requests by a computer system in a customer support center which includes support groups to service customer requests, the computer system including a call handling system, a text classification system and memory having a domain specific knowledge base having a plurality of categories stored therein representative of the support groups within the customer support center, each support group being identified by a name, and a rule base, the method comprising the steps of:

(a) receiving a customer service request by the computer system from the call handling system;

(b) passing the customer service request to the text classification system to determine where to route the customer service request within the customer support center;

(c) parsing the customer service request into a first list of recognized keywords;

(d) using the first list to deduce further facts from the customer service request;

(e) compiling the deduced facts into a second list;

(f) calculating, utilizing the first list, a numeric similarity score for each one of the plurality of categories in the knowledge base to indicate how similar each one of the plurality of categories is to the customer service request;

(g) applying a dynamic threshold to identify which support groups should handle the customer service request by determining which ones of the plurality of categories are most similar to the recognized keywords of the customer service request;

(h) compiling the ones of the plurality of categories determined to be most similar in step (g) into a third list;

(i) utilizing the rule base to select certain ones of the plurality of categories determined to be most similar to the recognized keywords over other ones of the plurality of categories based on the first and second lists;

(j) modifying the third list of the most similar categories to include the certain ones of the plurality of categories selected;

(k) passing the first list, the second list and the third list back to the call handling system; and (l) routing the customer service request to the selected one of the support groups.

13. The method according to claim 11 or 12 wherein the domain specific knowledge base includes a knowledge base of keyword/category profiles, each category in the keyword/category profiles knowledge base having an associated profile which indicates what information provides evidence for a given category, the keyword/profile weight knowledge base is arranged to have associated with each keyword in a profile a profile weight that represents the amount of evidence a keyword provides for a given category, the method further comprising the step of adjusting the profile weights in the keyword/category profiles in the domain specific knowledge base based upon the one of the support groups selected to handle the customer service request and a second one of the support groups determined most relevant to the natural language input text by an external source.

14. A text classification system comprising:

a memory;

a domain specific knowledge base stored in said memory having a plurality of categories wherein the domain specific knowledge base includes a knowledge base of keyword/category profiles, each category in the keyword/category profiles knowledge base having an associated profile which indicates what information provides evidence for a given category, the keyword/profile knowledge base is arranged to have associated with each keyword in a profile a profile weight that represents the amount of evidence a keyword provides for a given category; and a computer coupled to the memory, the computer including:

means for accepting as input into the computer, natural language input text, means for parsing the natural language input text into a first list of recognized keywords, means for using the first list to deduce further facts from the natural language input text, means for compiling the deduced facts into a second list, means for calculating a numeric similarity score for each one of the plurality of categories in the knowledge base to indicate how similar one of the plurality of categories is to the natural language input text, means for applying a dynamic threshold to determine which ones of the plurality of categories are most similar to the recognized keywords of the first list, means for adjusting the profile weights in the keyword/categories determined to be the most relevant to the natural language input text and a second ones of the plurality of categories determined most relevant to the natural language input text by an external source, means for compiling the ones of the plurality of categories determined to be most similar into a third list, and means for passing the first list, the second list and the third list to an external application.

15. The text classification system according to claim 14 wherein the keywords comprises words, phrases and regular expressions.

16. The text classification system according to claim 14 wherein the domain specific knowledge base further includes a rule base and the computer further comprises:

means for utilizing the rule base to select certain ones of the plurality of categories that were determined to be most similar to the recognized keywords over other ones of the plurality of categories based on the first and second lists; and means for modifying the third list of the most similar categories to include the certain ones of the plurality of categories selected.

17. The text classification system according to claim 14 wherein the domain specific knowledge base includes a knowledge base of keyword/category profiles, each category in the keyword/category profiles knowledge base having an associated profile which indicates what information provides evidence for a given category, the keyword/profile weight knowledge base is arranged to have associated with each keyword in a profile a profile weight that represents the amount of evidence a keyword provides for a given category, wherein the computer further comprises means for adjusting the profile weights in the keyword/category profiles in the domain specific knowledge base based upon the ones of the plurality of categories determined most relevant to the natural language input text and a second ones of the plurality of categories determined most relevant to the natural language input text by an external source.

18. A method for classifying natural language text input into a computer system, the system includes memory having a domain specific knowledge base having a plurality of categories stored therein and including a rule base, the method comprising the steps of:

(a) accepting as input natural language input text;

(b) parsing the natural language input text into a first list of recognized keywords;

(c) using the first list to deduce further facts from the natural language input text;

(d) compiling the deduced facts into a second list;

(e) calculating a numeric similarity score for each one of the plurality of categories in the knowledge base to indicate how similar one of the plurality of categories is to the natural language input text;

(f) applying a dynamic threshold to determine which ones of the plurality of categories are most similar to the recognized keywords of the first list;

(g) compiling the ones of the plurality of categories determined to be most similar in step (f) into a third list;

(h) utilizing the rule base to select certain ones of the plurality of categories determined to be most similar to the recognized keywords over other ones of the plurality of categories based on the first and second lists; and (i) modifying the third list of the most similar categories to include the certain ones of the plurality of categories selected.

19. The text classification system according to claim 14 wherein the means for applying a dynamic threshold further includes:

means for calculating a value for the dynamic threshold based upon a similarity score of a most similar category and a predefined threshold offset; and means for classifying the categories based upon their respective similarity scores by discarding categories whose similarity scores are below the threshold value.

20. A method for classifying natural language text input into a computer system, the system includes memory having a domain specific knowledge base having a plurality of categories stored therein, the knowledge base including a lexicon that includes words, phrases and expressions and a keyword class hierarchy structured such that keywords that share something in common are grouped into classes, each class has associated facts that are true when a member of the class is identified in the natural language inputs text, the method comprising the steps of:

(a) accepting as input natural language input text;

(b) parsing the natural language input text into a first list of recognized keywords;

(c) using the first list to deduce further facts from the natural language input text comprising the substeps of:

(1) searching the keyword class hierarchy for all classes of which an identified keyword in the first list is a member, (2) locating all substitution keywords associated with each class of which the identified keyword is a member, (3) retrieving the located substitution keywords, (4) substituting the located substitution keywords for the identified keyword, (5) using the located substitution keywords to identify matches between the located substitution keywords and phrases in the lexicon, (6) recursively applying sub-steps (2) through (5) on all classes above the classes of which the identified keyword is a member in the keyword class hierarchy, and (7) repeating sub-steps (1) through (6) for each keyword in the first list;

(d) compiling the deduced facts into a second list;

(e) calculating a numeric similarity score for each one of the plurality of categories in the knowledge base to indicate how similar one of the plurality of categories is to the natural language input text;

(f) applying a dynamic threshold to determine which ones of the plurality of categories are most similar to the recognized keywords of the first list; and (g) compiling the ones of the plurality of categories determined to be most similar in step (f) into a third list.

21. A text classification system comprising:
    memory;
    a domain specific knowledge base stored in said memory having a plurality of categories, the domain specific knowledge base including a rule base; and
    a computer coupled to the memory, the computer including:
    a natural language module for accepting as input into the computer natural language input text, the natural language module includes means for parsing the natural language input text into a first list of recognized keywords;
    an intelligent inferencer module for using the first list to deduce further facts from the information explicitly stated in the natural language input text, the intelligent inferencer module includes means for compiling the deduced facts into a second list;
    a similarity measuring module for calculating a numeric similarity score for each one of the plurality of categories in the knowledge base to indicate how similar one of the plurality of categories is to the natural language input text, the similarity measuring module includes:
    means for applying a dynamic threshold to determine which ones of the plurality of categories are most similar to the recognized keywords of the natural language input text, and
    means for compiling the ones of the plurality of categories determined to be most similar into a third list; and
    a category disambiguation module for utilizing the rule base to select certain ones of the plurality of categories determined to be most similar to the recognized keywords over other ones of the plurality of categories based on the first and second lists, the category disambiguation module includes means for modifying the third list of the most similar categories to include the certain ones of the plurality of categories selected.

22. A text classification system comprising:
    a memory;
    a domain specific knowledge base stored in said memory having a rule base and a plurality of categories; and
    a computer coupled to the memory, the computer including:
    means for accepting as input into the computer, natural language input text,
    means for parsing the natural language input text into a first list of recognized keywords,
    means for using the first list to deduce further facts from the natural language input text,
    means for compiling the deduced facts into a second list,
    means for calculating a numeric similarity score for each one of the plurality of categories in the knowledge base to indicate how similar one of the plurality of categories is to the natural language input text,
    means for applying a dynamic threshold to determine which ones of the plurality of categories are most similar to the recognized keywords of the first list,
    means for compiling the ones of the plurality of categories determined to be most similar into a third list,
    means for utilizing the rule base to select certain ones of the plurality of categories that were determined to be most similar to the recognized keywords over other ones of the plurality of categories based on the first and second lists, and
    means for modifying the third list of the most similar categories to include the certain ones of the plurality of categories selected.

23. A text classification system comprising:
    a memory;
    a domain specific knowledge base stored in said memory having a plurality of categories; and
    a computer coupled to the memory, the computer including:
    means for accepting as input into the computer, natural language input text,
    means for parsing the natural language input text into a first list of recognized keywords,
    means for using the first list to deduce further facts from the natural language input text,
    means for compiling the deduced facts into a second list,
    means for calculating a numeric similarity score for each one of the plurality of categories in the knowledge base to indicate how similar one of the plurality of categories is to the natural language input text,
    means for applying a dynamic threshold to determine which ones of the plurality of categories are most similar to the recognized keywords of the first list,
    means for calculating a value for the dynamic threshold based upon a similarity score of a most similar category and a predefined threshold offset,
    means for classifying the categories based upon their respective similarity scores by discarding categories whose similarity scores are below the threshold value, and
    means for compiling the ones of the plurality of categories determined to be most similar into a third list.

24. A text classification system comprising:
    a memory;
    a domain specific knowledge base stored in said memory having a plurality of categories, the domain specific knowledge base including a knowledge base of keyword/category profiles, each category in the keyword/category profiles knowledge base having an associated profile which indicates what information provides evidence for a given category, the keyword/profile weight knowledge base is arranged to have associated with each keyword in a profile a profile weight that represents the amount of evidence a keyword provides for a given category; and
    a computer coupled to the memory, the computer including:

means for accepting as input into the computer, natural language input text, means for parsing the natural language input text into a first list of recognized keywords, means for using the first list to deduce further facts from the natural language input text, means for compiling the deduced facts into a second list, means for calculating a numeric similarity score for each one of the plurality of categories in the knowledge base to indicate how similar one of the plurality of categories is to the natural language input text, means for applying a dynamic threshold to determine which ones of the plurality of categories are most similar to the recognized keywords of the first list, means for compiling the ones of the plurality of categories determined to be most similar into a third list, and means for adjusting the profile weights in the keyword/category profiles in the domain specific knowledge base based upon the ones of the plurality of categories determined most relevant to the natural language input text and a second ones of the plurality of categories determined most relevant to the natural language input text by an external source.

* * * * *